United States Patent
Huang et al.

(10) Patent No.: US 10,162,460 B2
(45) Date of Patent: Dec. 25, 2018

(54) TOUCH DEVICE

(71) Applicant: AU Optronics Corporation, Hsin-Chu (TW)

(72) Inventors: Wei-Shun Huang, Hsin-Chu (TW);
Ching-Chien Yuan, Hsin-Chu (TW);
Tzu-Jung Chen, Hsin-Chu (TW);
Chia-Feng Yang, Hsin-Chu (TW);
Che-Hsien Chen, Hsin-Chu (TW)

(73) Assignee: AU OPTRONICS CORPORATION, Hsin-Chu (TW)

( * ) Notice: Subject to any disclaimer, the term of this patent is extended or adjusted under 35 U.S.C. 154(b) by 0 days.

(21) Appl. No.: 15/592,354

(22) Filed: May 11, 2017

(65) Prior Publication Data
US 2018/0129339 A1  May 10, 2018

(30) Foreign Application Priority Data

Nov. 4, 2016  (TW) .............................. 105136008 A

(51) Int. Cl.
*G06F 3/041* (2006.01)
*G06F 3/044* (2006.01)

(52) U.S. Cl.
CPC ............ *G06F 3/0416* (2013.01); *G06F 3/044* (2013.01); *G06F 2203/04107* (2013.01)

(58) Field of Classification Search
CPC .................................. G06F 3/044; G06F 3/416
USPC .............................. 345/156–184; 1/1; 349/12
See application file for complete search history.

(56) References Cited

U.S. PATENT DOCUMENTS

| | | | |
|---|---|---|---|
| 2014/0168138 A1* | 6/2014 | Kuo .................. | G06F 3/0412 345/174 |
| 2014/0176465 A1 | 6/2014 | Ma et al. | |
| 2014/0184533 A1* | 7/2014 | Park .................. | G06F 3/0416 345/173 |
| 2014/0184950 A1* | 7/2014 | Chu .................. | G06F 3/0416 349/12 |
| 2014/0198268 A1* | 7/2014 | Sugita ................ | G06F 3/044 349/12 |
| 2015/0277635 A1* | 10/2015 | Kim .................. | G06F 3/047 345/173 |
| 2015/0338963 A1* | 11/2015 | Lee ................... | G06F 3/044 345/174 |

(Continued)

FOREIGN PATENT DOCUMENTS

TW  201317847 A  5/2013
TW  M512750 U  11/2015

OTHER PUBLICATIONS

Taiwan Patent Office "Office Action" dated Feb. 15, 2017, Taiwan.

*Primary Examiner* — Prabodh M Dharia
(74) *Attorney, Agent, or Firm* — WPAT, PC

(57) ABSTRACT

A touch device includes a substrate, a touch electrode layer, a first wire, and at least one second wire The substrate includes a touch region and a peripheral region. The peripheral region is surrounding the touch region. The touch electrode layer is disposed at the touch region. The first wire is disposed at the peripheral region and is configured to receive a touch driving signal. The at least one second wire is disposed at the peripheral region and is configured to receive a synchronization signal corresponding to the touch driving signal. The first wire is disposed between the touch region and the at least one second wire.

11 Claims, 7 Drawing Sheets

(56) References Cited

U.S. PATENT DOCUMENTS

| | | | |
|---|---|---|---|
| 2016/0259452 A1* | 9/2016 | Lee | G06F 3/047 |
| 2016/0320872 A1* | 11/2016 | Lee | G06F 3/044 |
| 2017/0124690 A1* | 5/2017 | Sundvor | G06T 7/001 |
| 2017/0147117 A1* | 5/2017 | Song | G06F 3/0412 |
| 2017/0147123 A1* | 5/2017 | Wang | G06F 3/0412 |
| 2017/0173262 A1* | 6/2017 | Veltz | A61M 5/1723 |

* cited by examiner

TOUCH DEVICE

BACKGROUND

Technical Field

This disclosure relates to a touch technology, and in particular, to a touch device.

Related Art

Recently, with the development of touch technologies, touch devices (for example, touch panels) have been applied to various types of electronic devices, for example, smartphones, tablet computers, or other portable electronic devices.

In the related art, a touch device is provided with many wires for transmitting different signals. However, when the wires are corroded, the touch device are malfunction.

SUMMARY

In view of the above, the context of this disclosure provides a touch device, so as to resolve the described problem in the prior art.

An implementation manner of the context of this disclosure relates to a touch device. The touch device comprises a substrate, a touch electrode layer, a first wire, and at least one second wire. The substrate comprises a touch region and a peripheral region. The peripheral region is surrounding the touch region. The touch electrode layer is disposed at the touch region. The first wire is disposed at the peripheral region and is configured to receive a touch driving signal. The at least one second wire is disposed at the peripheral region and is configured to receive a synchronization signal corresponding to the touch driving signal. The first wire is disposed between the peripheral region and the at least one second wire.

To sum up, in the touch device of this disclosure, a first wire receives a touch driving signal, and a second wire adjacent to the first wire receives a synchronization signal corresponding to the touch driving signal, thereby improving the reliability of the first wire.

BRIEF DESCRIPTION OF THE DRAWINGS

To make the foregoing and other objectives, features, advantages, and embodiments of this disclosure more comprehensible, the accompanying drawings are described as follows.

DETAILED DESCRIPTION

The following describes the embodiments in detail with reference to the accompanying drawings. However, the provided embodiments are not intended to limit the scope of this disclosure, and the description of the operation of a structure is not intended to limit an execution sequence. Any apparatus with equivalent functions that is produced from a structure formed by a recombination of elements shall fall within the scope of this disclosure. In addition, the drawings are intended for description only, and are not drawn according to original dimensions. To facilitate comprehension, same elements or like elements in the description below are denoted by a same reference sign.

The terms used in this specification and the claims generally have their ordinary meanings in the art, in the context of this disclosure, and in specific contexts unless the terms are additionally annotated.

The terms such as "first", "second" and "third" used in this specification are not intended to indicate sequences or orders and are not intended to limit this disclosure, and are merely intended to distinguish between elements or operations described by using a same technical term.

Figure 1A:
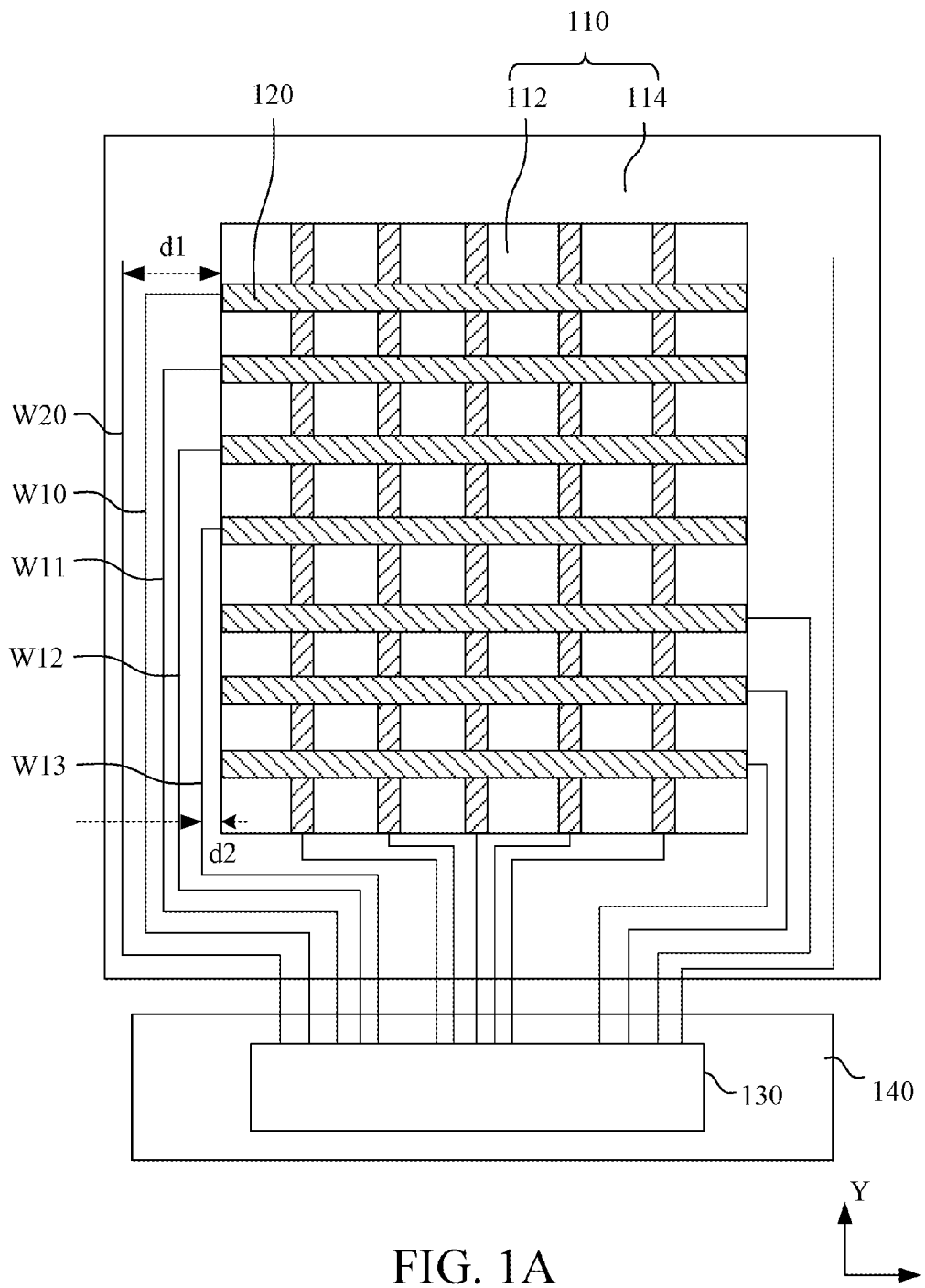
FIG. 1A is a schematic diagram of a touch device according to some embodiments of this disclosure.

Referring to FIG. 1A, FIG. 1A is a schematic diagram of a touch device 100 according to some embodiments of this disclosure. For example, the touch device 100 is a touch panel or a touch display panel. In some embodiments, the touch device 100 includes a substrate 110, a touch electrode layer 120, a wire W10, and a wire W20. In some embodiments, the touch device 100 further includes a wire W11, a wire W12, and a wire W13.

The substrate 110 includes a touch region 112 and a peripheral region 114. The touch region 112 is used to allow a user to perform a touch operation thereon. The peripheral region 114 is used to allow wiring, bezel wrapping, or used to represent various decorative patterns. In some embodiments, the touch region 112 is a rectangular region or a region of another shape. The peripheral region 114 is surrounding the touch region 112. The touch electrode layer 120 is disposed at the touch region 112. The touch region 112 in FIG. 1A is rectangular, but this disclosure is not limited thereto. The shape of the touch region 112 may be designed according to actual requirements.

The touch electrode layer 120 includes a plurality of electrodes. The electrodes include driving electrodes and sensing electrodes. Using FIG. 1A as an example, electrodes extending along a direction X are driving electrodes, and electrodes extending along a direction Y are sensing electrodes. In some embodiments, the direction X is a horizontal direction, and the direction Y is a vertical direction. In some embodiments, the direction X and the direction Y are orthogonal to each other, but this disclosure is not limited thereto. The driving electrodes and the sensing electrodes are arranged in a staggered manner. In some embodiments, the electrodes are elongated, but this disclosure is not limited thereto. Electrodes of various shapes all fall within the scope of this disclosure, for example, rhombus, triangle, or comb-like shape. Materials of the electrodes include metals, metal oxides, or various other conductive materials. An example of a metal may be silver, copper, or another metal material. The metal oxide may be indium tin oxide (ITO), indium zinc oxide (IZO), zinc oxide (ZnO), or aluminum zinc oxide (AZO). The materials of the electrodes may be selected according to actual requirements.

In addition, the touch electrode layer 120 may complete a touch sensing operation in a self-capacitance manner, a mutual-capacitance manner, or various other sensing manners.

In some embodiments, the touch device 100 further includes a control unit 130 and a circuit board 140. The control unit 130 is disposed on the circuit board 140. For example, the control unit 130 is a control circuit or a control wafer. The control unit 130 is configured to output various types of signals, so as to control the touch device 100. For example, the circuit board 140 is a printed circuit board or a flexible circuit board.

Configuration of the wires of the peripheral region 114 is described in detail below. Using FIG. 1A as an example, because content of a left portion of the peripheral region 114 is similar to content of a right portion of the peripheral region 114, only the left portion of the peripheral region 114 is described below.

Using the left portion of the peripheral region 114 as an example, one end of each of the wire W10, the wire W11, the wire W12, and the wire W13 is connected to the control unit 130. The other end of each of the wire W11, the wire W12, and the wire W13 is connected to a driving electrode of the touch electrode layer 120. One end of the wire W20 is connected to the control unit 130. The other end of the wire W20 is floating.

Using FIG. 1A as an example, the wire W20, the wire W10, the wire W11, the wire W12, and the wire W13 are sequentially disposed at the peripheral region 114 from an outer side to an inner side. As compared with the "inner side", the "outer side" is farer away from the touch region 112. As compared with the "outer side", the "inner side" is closer to the touch region 112. In other words, in the foregoing wires, a distance d1 between a portion, extending along the direction Y, of the wire W20 and the touch region 112 is the largest. A distance d2 between a portion, extending along the Y direction, of the wire W13 and the touch region 112 is the smallest.

The wire W10 is adjacent to the wire W20. Specifically, in the foregoing wires (W10, W11, W12, and W13) connected to the touch electrode layer 120, a distance d1 between the wire W10 and the wire W20 is greater than a distance d2 between the wire W13 and the wire W20. In some embodiments, the foregoing wires are implemented by using a metal material, but this disclosure is not limited thereto. Besides, a quantity of wires connected to the touch electrode layer 120 is not limited to the quantity shown in FIG. 1A.

The control unit 130 outputs touch driving signals to the driving electrodes in the touch electrode layer 120 through the wire W10, the wire W11, the wire W12, and the wire W13. When a touch event occurs, sensing electrodes at a touch position generate coupling signals corresponding to the touch driving signals. Subsequently, the control unit 130 receives the coupling signals through the corresponding sensing electrodes and the corresponding wires. Subsequently, the control unit 130 determines the position of the touch event according to the coupling signals.

Figure 1B:
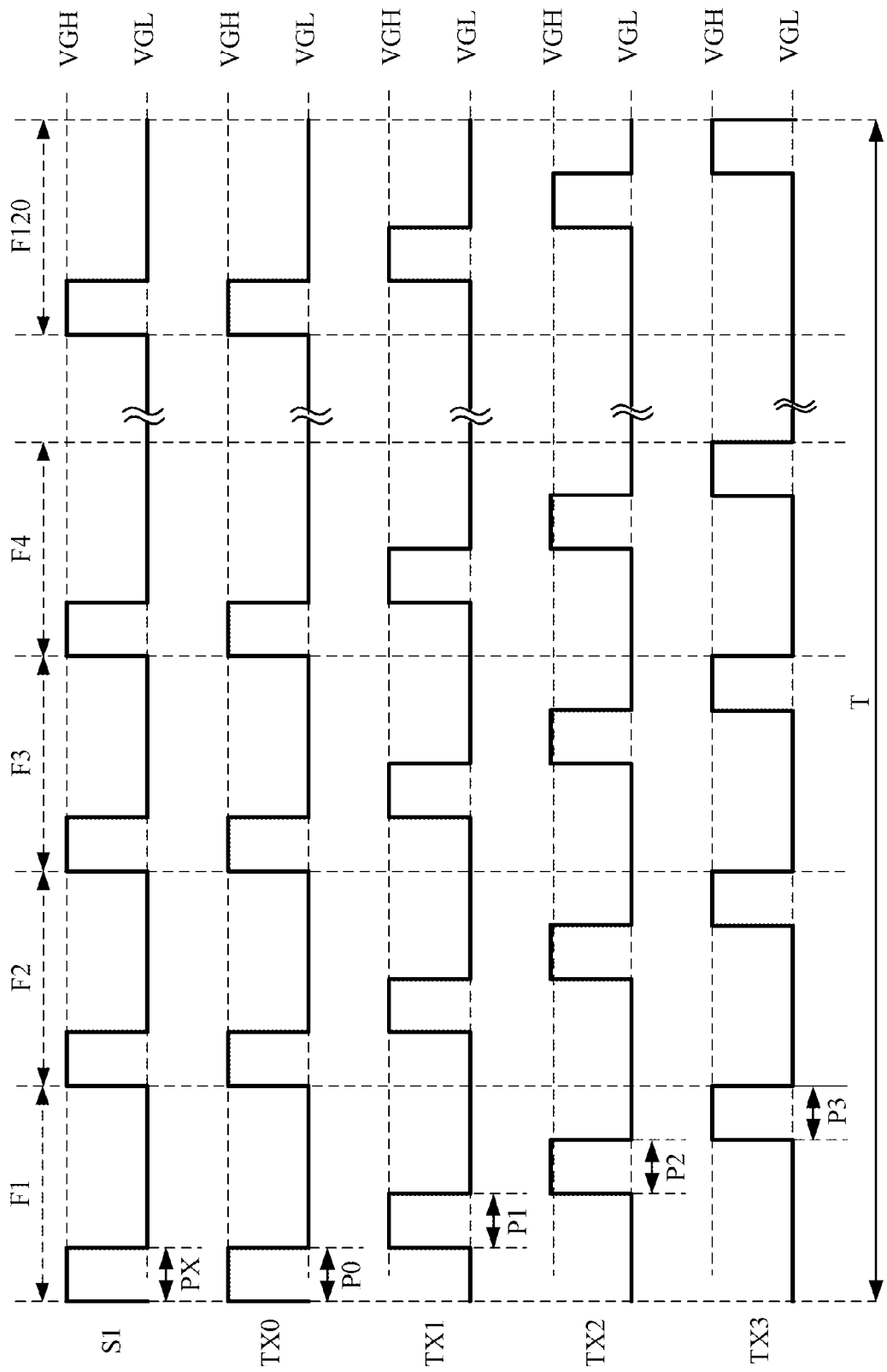
FIG. 1B is a timing diagram of a plurality of signals of the touch device according to FIG. 1A.

Referring to FIG. 1A and FIG. 1B at the same time, FIG. 1B is a timing diagram of a plurality of signals of the touch device 100 according to FIG. 1A. In some embodiments, the signals are voltage signals. Each of the signals has a logic level VGH (for example, a high logic level) and a logic level VGL (for example, a low logic level).

The control unit 130 is configured to output a touch driving signal TX0, a touch driving signal TX1, a touch driving signal TX2, and a touch driving signal TX3.

The wire W10 is configured to transmit the touch driving signal TX0 to a first driving electrode in the touch electrode layer 120. The wire W11 is configured to transmit the touch driving signal TX1 to a second driving electrode in the touch electrode layer 120. The wire W12 is configured to transmit the touch driving signal TX2 to a third driving electrode in the touch electrode layer 120. The wire W13 is configured to transmit the touch driving signal TX3 to a fourth driving electrode in the touch electrode layer 120.

The control unit 130 is configured to output a synchronization signal S1 to the wire W20. Using FIG. 2 as an example, the synchronization signal S1 and the touch driving signal TX0 are synchronized in timing. In some embodiments, a voltage waveform of the synchronization signal S1 and a voltage waveform of the touch driving signal TX0 are essentially the same.

The synchronization signal S1 and the touch driving signal TX0 are synchronized in timing, and essentially have the same voltage waveform, and therefore, a voltage difference between the wire W20 and the wire W10 is close to zero. In this way, a corrosion problem of the wire W10 caused by being in an environment with an excessively large voltage difference for a long time can be alleviated, thereby further improving the reliability of the touch device 100. When the reliability of the touch device 100 is improved, the touch device 100 has higher reliability in a high-temperature or high-humidity environment.

Using FIG. 1B as an example, in a period of a same frame, enabling periods of the touch driving signals are different in timing. For example, in the period of a first frame F1, an enabling period P0 of the touch driving signal TX0 is earlier than an enabling period P1 of the touch driving signal TX1. The enabling period P1 of the touch driving signal TX1 is earlier then an enabling period P2 of the touch driving signal TX2. The enabling period P2 of the touch driving signal TX2 is earlier then an enabling period P3 of the touch driving signal TX3. In other words, the touch electrodes of the touch electrode layer 120 are sequentially driven.

In some embodiments, because the synchronization signal S1 and the touch driving signal TX0 are synchronized in timing, an enabling period PX of the synchronization signal S1 is the same as the enabling period P0 of the touch driving signal TX0.

In some other embodiments, the enabling periods of the driving signals are the same. For example, the enabling period of the driving signal TX1 is P0 rather than P1. The enabling period of the driving signal TX2 is P0 rather than P2. The enabling period of the driving signal TX3 is P0 rather than P3. In other words, in the period of the first frame F1, all the driving signals are in enabling states at the enabling period P1, and all the driving signals are in disenabling states in other periods within the period of the first frame F1. In this case, the enabling period of each driving signal includes a plurality of pulses rather than a single pulse as shown in FIG. 1B. Pulses of one driving signal are enabled to be different from pulses of another driving signal, thereby achieving an effect of avoiding an error in determining the touch position.

Figure 2:
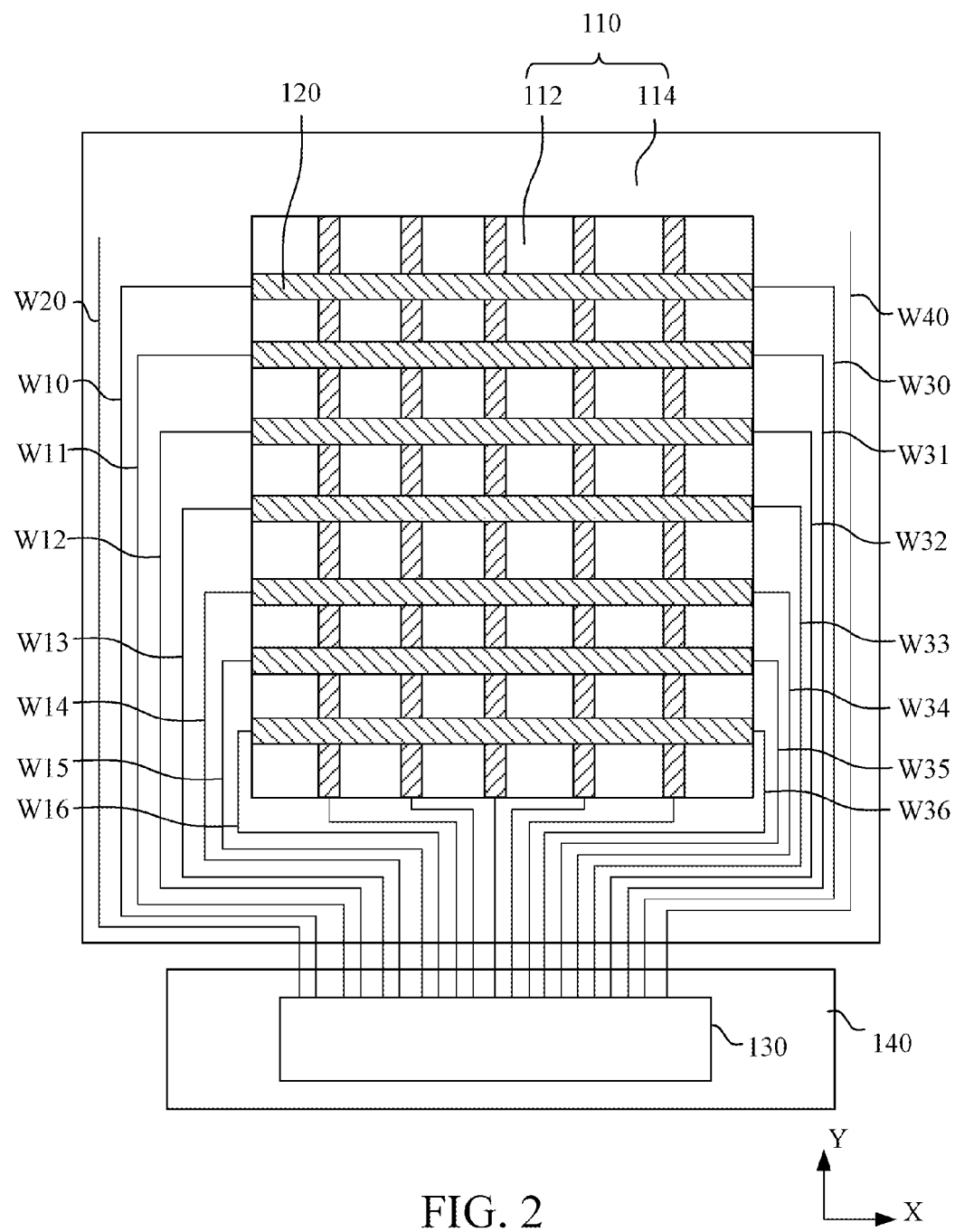
FIG. 2 is a schematic diagram of a touch device according to some embodiments of this disclosure.

FIG. 2 is a schematic diagram of a touch device 200 according to some embodiments of this disclosure. To facilitate comprehension, a like element in FIG. 2 are denoted by a same reference sign as that in FIG. 1A.

The touch device 200 differs from the touch device 100 of FIG. 1A in that, in the touch device 200, each driving electrode (the electrode extending along the direction X) is connected to two wires. For example, from top to bottom, a left end of the first driving electrode is connected to the wire W10, and a right end thereof is connected to a wire W30. A left end of the second driving electrode is connected to the wire W11, and a right end thereof is connected to a wire W31. A left end of the third driving electrode is connected to the wire W12, and a right end thereof is connected to a wire W32. A left end of the fourth driving electrode is connected to the wire W13, and a right end thereof is connected to a wire W33, and the like.

In some embodiments, two wires connected to a same driving electrode receive a same driving signal. For example, both of the wire W10 and the wire W30 receive the driving signal TX0 in FIG. 1B, both of the wire W11 and the wire W31 receive the driving signal TX1 in FIG. 1B, and the like. In other words, each driving electrode is driven by two identical driving signals. Each driving electrode can be driven by two wires, and therefore, when one of the two wires is corroded, the other wire can still be used to drive the driving electrode. As compared with the touch device 100, the touch device 200 has better reliability.

In some embodiments, the wire W20 and the wire W40 receive a same synchronization signal. For example, the control unit 130 outputs a synchronization signal S1 to the wire W20 and the wire W40. In this way, a voltage difference between the wire W20 and the wire W10 is close to zero, and a voltage difference between the wire W40 and the wire W30 is close to zero. By means of this configuration, a corrosion problem of the wire W10 and the wire W30 caused by being in an environment with an excessively large voltage difference for a long time can be alleviated, thereby further improving the reliability of the touch device 200.

Figure 3:
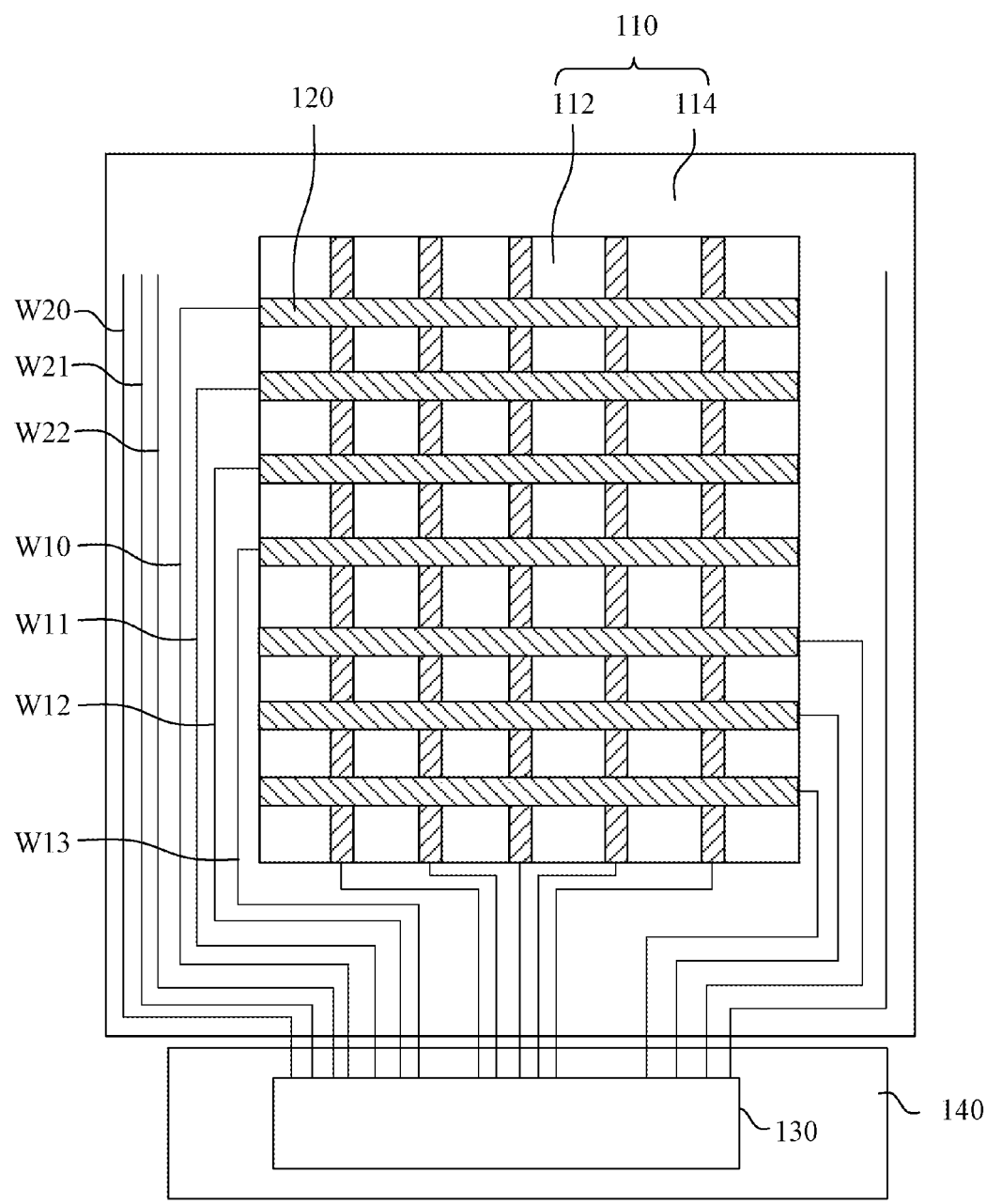
FIG. 3 is a schematic diagram of a touch device according to some embodiments of this disclosure.

Referring to FIG. 3, FIG. 3 is a schematic diagram of a touch device 300 according to some embodiments of this disclosure. To facilitate comprehension, a like element in FIG. 3 is denoted by a same reference sign as that in FIG. 1A.

The touch device 300 of FIG. 3 differs from the touch device 100 of FIG. 1A in that the touch device 300 further includes a wire W21 and a wire W22. Similar to the wire W20, one end of the wire W21 is connected to the control unit 130, and the other end of the wire W21 is floating. Similar to the wire W20, one end of the wire W22 is connected to the control unit 130, and the other end of the wire W22 is floating. The wire W20, the wire W21, and the wire W22 are all used to receive the synchronization signal S1 in FIG. 2. In other words, the signal received by the wire W20, the wire W21, and the wire W22 and the touch driving signal TX0 are synchronized in timing.

The synchronization signal S1 and the touch driving signal TX0 are synchronized in timing, and essentially have the same voltage waveform, and therefore, a voltage difference between the wire W10 and each of the wire W20, the wire W21, and the wire W22 is close to zero. In this way, a corrosion problem of the wire W10 caused by being in an environment with an excessively large voltage difference for a long time can be alleviated, thereby further improving the reliability of the touch device 300. Besides, when one of the foregoing wires (the wire W20, the wire W21, and the wire W22) is corroded, the other wires can still be used to receive the synchronization signal S1, thereby alleviating the corrosion problem of the wire W10, and further prolonging a service life of the touch device 300.

Figure 4:
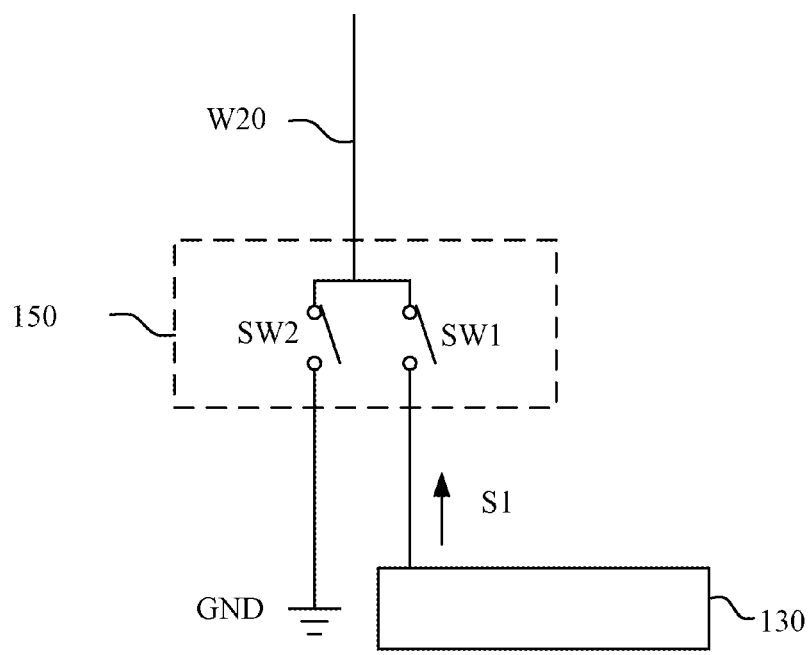
FIG. 4 is a schematic diagram of connections between a switch unit, a wire, a ground terminal, and a control unit according to some embodiments of this disclosure.

Referring to FIG. 4, to simplify the figure, FIG. 4 merely shows some elements in the touch device 100. FIG. 4 is a schematic diagram of connections between a switch unit 150, the wire W20, a ground terminal GND, and the control unit 130 according to some embodiments of this disclosure. To facilitate comprehension, a like element in FIG. 4 is denoted by a same reference sign as that in FIG. 1A.

In some embodiments, the wire W20 is connected to the switch unit 150. The switch unit 150 is configured to switch the wire W20 from being connected to the control unit 130 to being connected to the ground terminal GND, or switch the wire W20 from being connected to the ground terminal GND to being connected to the control unit 130.

In some embodiments, the switch unit 150 includes a switch SW1 and a switch SW2. The context of this disclosure does not limit the forms of the switch SW1 and the switch SW2. Various transistors or elements that can implement the foregoing switches fall within the consideration scope of the context of this disclosure. For example, the transistors or elements may be bipolar junction transistors (BJTs), metal-oxide semiconductor field-effect transistors (MOSFETs), or insulated gate bipolar transistors (IGBTs).

When the switch SW1 is on, the switch SW2 is off. In some embodiments, the switch SW1 and the switch SW2 may be implemented by switches of a same type (both are P-type switches or both are N-type switches). In this case, a control terminal of the switch SW1 and a control terminal of the switch SW2 receive reverse-phase control signals. In some other embodiments, the switch SW1 and the switch SW2 may be implemented by switches of different types (one is a P-type switch, and the other is an N-type switch). In this case, the control terminal of the switch SW1 and the control terminal of the switch SW2 receive in-phase control signals.

When the switch SW1 is on, the wire W20 and the control unit 130 are conducted by means of the switch SW1. In this way, the synchronization signal S1 from the control unit 130 can be transmitted to the wire W20 by means of the switch SW1.

When the switch SW2 is on, the wire W20 and the ground terminal GND are conducted by means of the switch SW2. Therefore, an electrostatic current on the wire W20 flows to the ground terminal GND by means of the switch SW2. In other words, when the switch SW2 is on, the wire W20, the switch SW2, and the ground terminal GND together form an electrostatic discharge (ESD) protection path, thereby preventing the touch device 100 from being damaged by the ESD.

Figure 5:
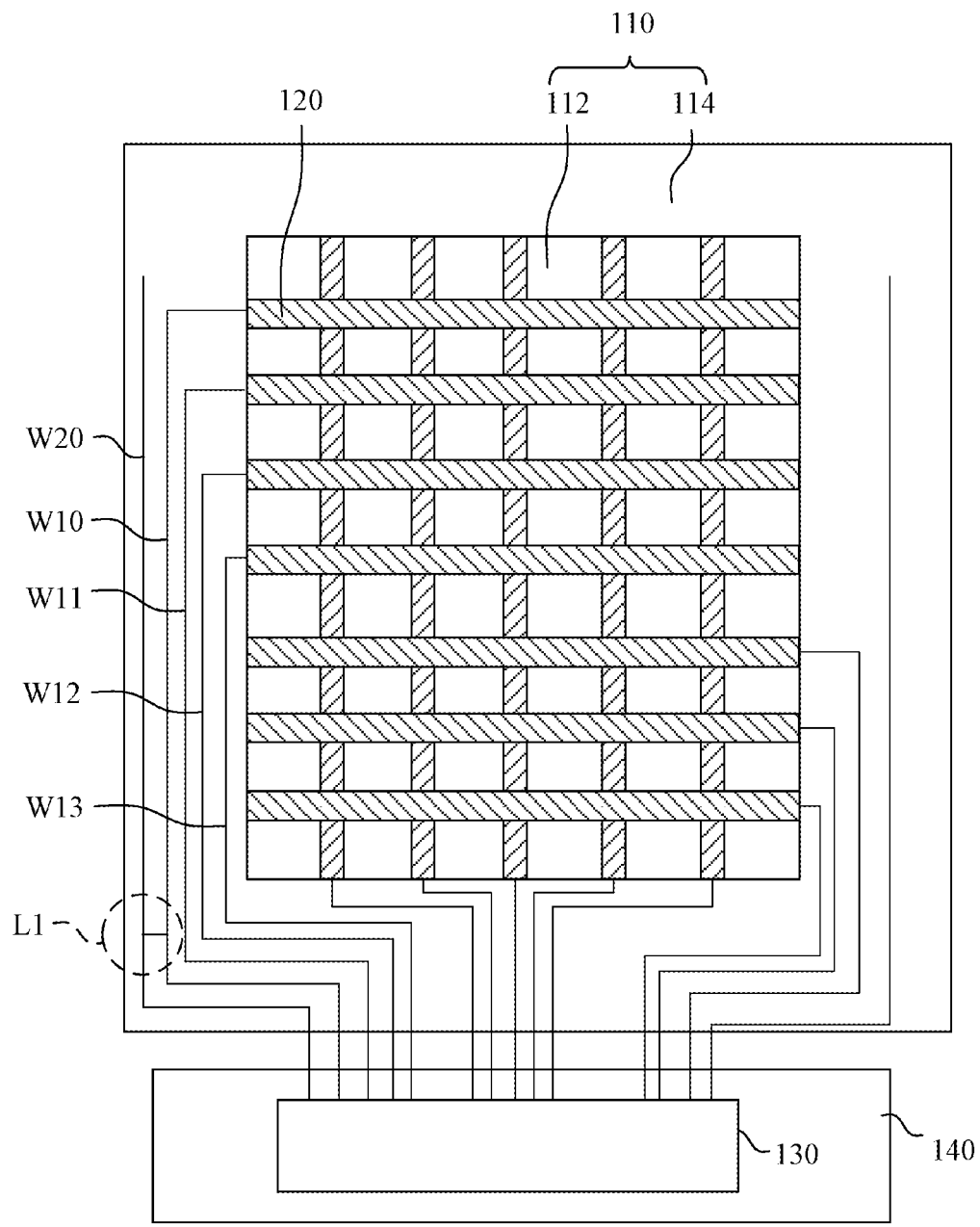
FIG. 5 is a schematic diagram of a touch device according to some embodiments of this disclosure.

Referring to FIG. 5, FIG. 5 is a schematic diagram of a touch device 500 according to some embodiments of this disclosure. To facilitate comprehension, a like element in FIG. 5 is denoted by a same reference sign as that in FIG. 1A.

The touch device 500 of FIG. 5 differs from the touch device 100 of FIG. 1A in that the wire W20 is connected to the wire W10. Using FIG. 5 as an example, the wire W20 and the wire W10 are connected at the peripheral region 114. In other words, a junction L1 of the wire W20 and the wire W10 is located at the peripheral region 114.

In these embodiments, the wire W20 does not receive the synchronization signal S1 from the control unit 130. Instead, the wire W20 receives a signal from the wire W10. In other words, both of the wire W20 and the wire W10 receive the touch driving signal TX0.

The wire W20 and the wire W10 receive the same signal (the touch driving signal TX0), and therefore, a voltage difference between the wire W20 and the wire W10 is close to zero. In this way, a corrosion problem of the wire W10 caused by being in an environment with an excessively large voltage difference for a long time can be alleviated, thereby further improving the reliability of the touch device 500.

Figure 6:
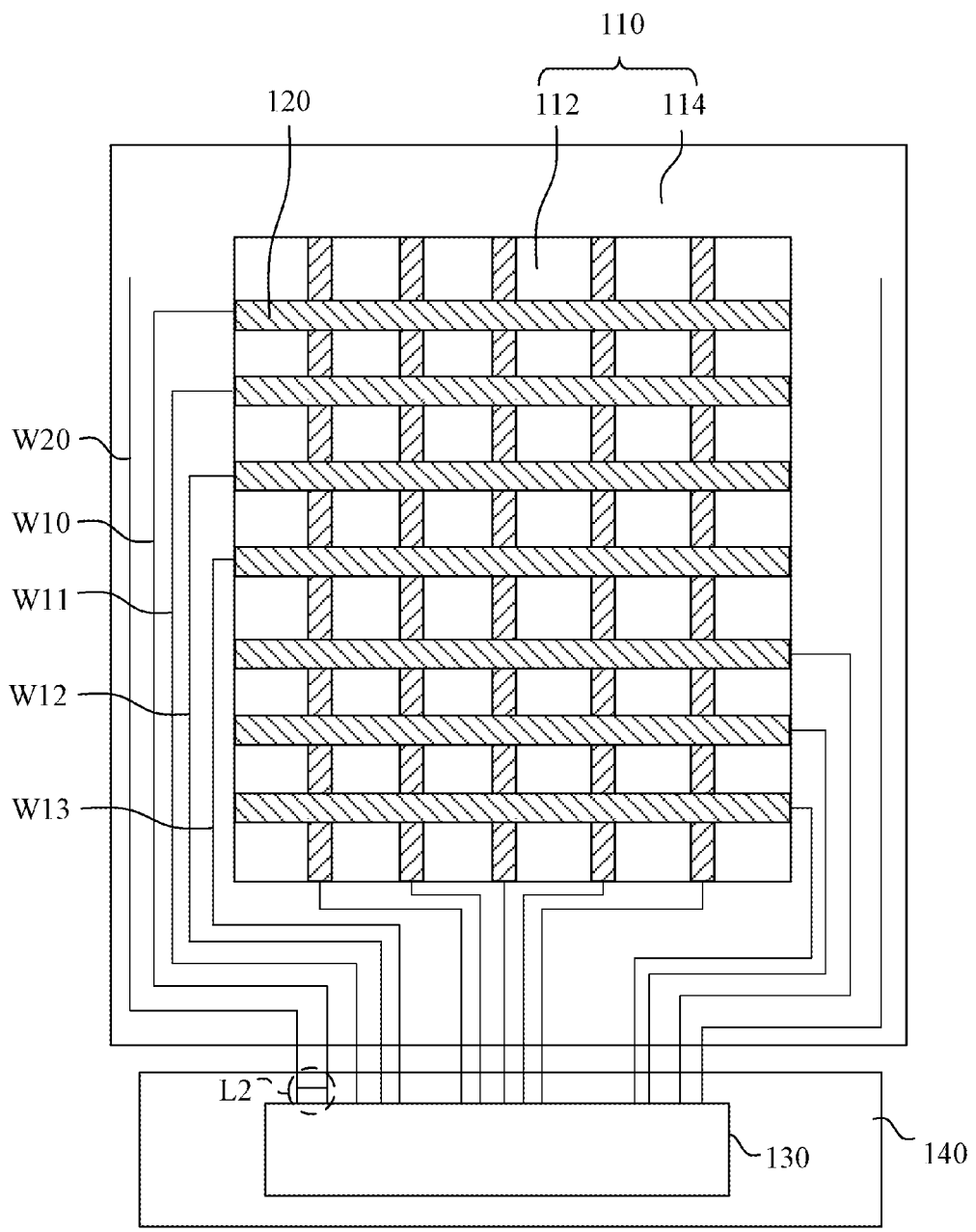
FIG. 6 is a schematic diagram of a touch device according to some embodiments of this disclosure.

Referring to FIG. 6, FIG. 6 is a schematic diagram of a touch device 600 according to some embodiments of this disclosure. To facilitate comprehension, a like element in FIG. 6 is denoted by a same reference sign as that in FIG. 5.

The touch device 600 of FIG. 6 differs from the touch device 500 of FIG. 5 in that the wire W20 and the wire W10 are connected at the circuit board 140. In other words, a junction L2 of the wire W20 and the wire W10 is located at the circuit board 140.

In these embodiments, the wire W20 does not receive the synchronization signal S1 from the control unit 130. Instead, in these embodiments, the wire W20 receives a signal from the wire W10. In other words, both of the wire W20 and the wire W10 receive the touch driving signal TX0.

By means of the foregoing practice, the voltage difference between the wire W20 and the wire W10 is close to zero. In this way, a corrosion problem of the wire W10 caused by being in an environment with an excessively large voltage difference for a long time can be alleviated, thereby further improving the reliability of the touch device 600.

In some embodiments, a reliability assessment value of the synchronization signal S1 is equal to a reliability assessment value of the touch driving signal TX0.

In some embodiments, a reliability assessment value of a signal is related to a voltage amplitude of the signal, duration of an enabling period of the signal within one frame, and an enabling frequency of the signal. In some embodiments, a reliability assessment value of a signal is directly proportional to a voltage amplitude of the signal, duration of an enabling period of the signal within one frame, and an enabling frequency of the signal.

In some embodiments, the reliability assessment value is obtained from the following formula (1):

$$K = v \times p \times f \tag{1}$$

K represents the reliability assessment value of a signal, in the unit of volt, v represents the voltage amplitude of the signal, in the unit of volt, p represents duration of an enabling period of the signal within one frame, in the unit of second, and f represents an enabling frequency of the signal, in the unit of times/second.

Referring to FIG. 2 again, using FIG. 2 as an example, a voltage waveform of the synchronization signal S1 and a voltage waveform of the touch driving signal TX0 are essentially the same. Therefore, a voltage amplitude of the synchronization signal S1 and a voltage amplitude of the touch driving signal TX0 are essentially the same. Using FIG. 2 as an example, a voltage amplitude of a signal is a difference between the logic level VGH and the logic level VGL. In some embodiments, the voltage amplitude is between 5 volts and 10 volts, but this disclosure is not limited thereto. The voltage amplitude can be adjusted according to actual requirements.

In addition, the synchronization signal S1 and the touch driving signal TX0 are synchronized in timing, and therefore, duration of the enabling period PX of the synchronization signal S1 and duration of the enabling period P0 of the touch driving signal TX0 are essentially the same. In some embodiments, the duration of the enabling period P0 is between 0.70 millisecond and 1.60 milliseconds, but this disclosure is not limited thereto. The duration of the enabling period P0 may be adjusted according to actual requirements.

Besides, the voltage waveform of the synchronization signal S1 and the voltage waveform of the touch driving signal TX0 are essentially the same, and therefore, an enabling frequency of the synchronization signal S1 and an enabling frequency of the touch driving signal TX0 are essentially the same. In some embodiments, the enabling frequency is between 90 times/second and 170 times/second. Using FIG. 2 as an example, if the enabling frequency of the synchronization signal S1 is 120 times/second, and the time T is 1 second, it indicates that the synchronization signal S1 is enabled for 120 times in the time T. Each time of enabling corresponds to one frame. Therefore, the time T corresponds to 120 frames. To simplify the figure, FIG. 2 merely shows the period of the first frame F1, a period of a second frame F2, a period of a third frame F3, a period of a fourth frame F4, and a period of a 120$^{th}$ frame F120.

The voltage amplitude of the synchronization signal S1 and the voltage amplitude of the touch driving signal TX0 are essentially the same, the duration of the enabling period PX and the duration of the enabling period P0 are essentially the same, and the enabling frequency of the synchronization signal S1 and the enabling frequency of the touch driving signal TX0 are essentially the same. Therefore, a reliability value of the synchronization signal S1 and a reliability value of the touch driving signal TX0 will be the same.

In some embodiments, the foregoing reliability value can be calculated by the control unit 130 or another calculation circuit. In some embodiments, the control unit 130 compares the reliability value of the synchronization signal S1 with a preset value. For example, the preset value is 0.8 volt. The preset value may be stored in a temporary storage circuit. In some embodiments, the temporary storage circuit and the control unit 130 are integrated to form a single element.

When the reliability value is greater than the preset value, it indicates that the wire W10 of the touch device 100 may be easily corroded. Therefore, in some embodiments, when the reliability value is greater than the preset value, the control unit 130 adjusts the amplitude of the touch driving signal TX0, the duration of the enabling period P0 of the touch driving signal TX0, or the enabling frequency of the touch driving signal TX0, so as to enable the reliability value of the touch driving signal TX0 to be less than the preset value. In some embodiments, the control unit 130 adjusts the synchronization signal S1 according to the adjusted touch driving signal TX0, thereby ensuring the reliability of the touch device 100.

To sum up, in the touch device of this disclosure, a first wire receives a touch driving signal, and a second wire adjacent to the first wire receives a synchronization signal corresponding to the touch driving signal, thereby improving the reliability of the first wire.

Although this disclosure is described above by means of the implementation manners, the above description is not intended to limit this disclosure. A person of ordinary skill in the art can make various variations and modifications without departing from the spirit and scope of this disclosure, and therefore, the protection scope of this disclosure is as defined in the appended claims.

What is claimed is:

1. A touch device, comprising:
  a substrate, comprising a touch region and a peripheral region surrounding the touch region;
  a touch electrode layer, disposed at the touch region;
  a first wire, disposed at the peripheral region, for receiving a touch driving signal; and
  a second wire, disposed at the peripheral region, for receiving a synchronization signal corresponding to the touch driving signal, wherein the first wire is disposed between the touch region and the second wire;
  wherein both the touch driving signal and the synchronization signal have a first reliability assessment value, wherein the first reliability assessment value is related to a signal voltage amplitude, duration of a signal enabling period per frame, and a signal enabling frequency.

2. The touch device according to claim 1, wherein the synchronization signal and the touch driving signal are synchronized in timing.

3. The touch device according to claim 1, wherein the synchronization signal and the touch driving signal have a synchronized voltage waveform.

4. The touch device according to claim 1, further comprises a plurality of second wires for receiving a plurality of synchronization signals corresponding to the touch driving signal, wherein the plurality of the synchronization signals are synchronized in timing.

5. The touch device according to claim 1, further comprising:
   a switch unit, for switching the second wire between connecting to a control unit and connecting to a ground terminal.

6. The touch device according to claim 5, wherein the switch unit comprises:
   a first switch, for controlling the second wire to connect to the control unit, wherein the synchronization signal from the control unit is transmitted to the second wire via the first switch.

7. The touch device according to claim 5, wherein the switch unit comprises:
   a second switch, for controlling the second wire to connect to the ground terminal, so that an electrostatic current on the second wire flows to the ground terminal by means of the second switch.

8. The touch device according to claim 1, wherein the second wire connects to the first wire.

9. The touch device according to claim 1, wherein the second wire and the first wire are connected at the peripheral region.

10. The touch device according to claim 1, further comprising:
    a circuit board; and
    a control unit, disposed on the circuit board, wherein the first wire is connected to the control unit, and the second wire and the first wire are connected at the circuit board.

11. The touch device according to claim 1, wherein the second wire is floating.

* * * * *